Sept. 26, 1944.  G. V. HOLLOMAN ET AL  2,358,804
AUTOMATIC CONTROL FOR ANTI-ICER APPARATUS FOR AIRCRAFT
Filed Feb. 10, 1940  2 Sheets-Sheet 1
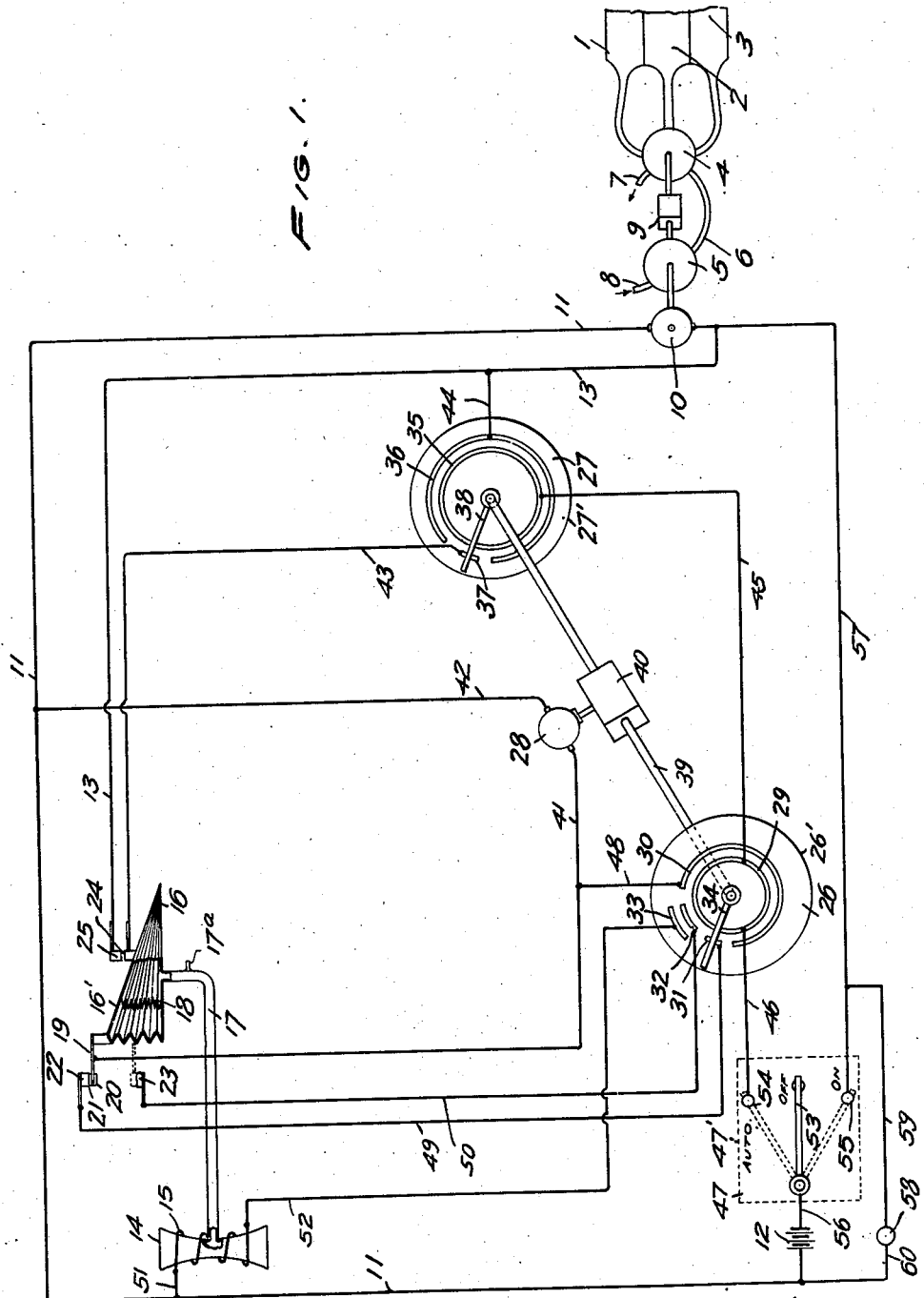
INVENTORS
GEORGE V. HOLLOMAN
WILLIAM E. HUFFMAN
BY
ATTORNEYS Sept. 26, 1944. G. V. HOLLOMAN ET AL 2,358,804
AUTOMATIC CONTROL FOR ANTI-ICER APPARATUS FOR AIRCRAFT
Filed Feb. 10, 1940 2 Sheets-Sheet 2
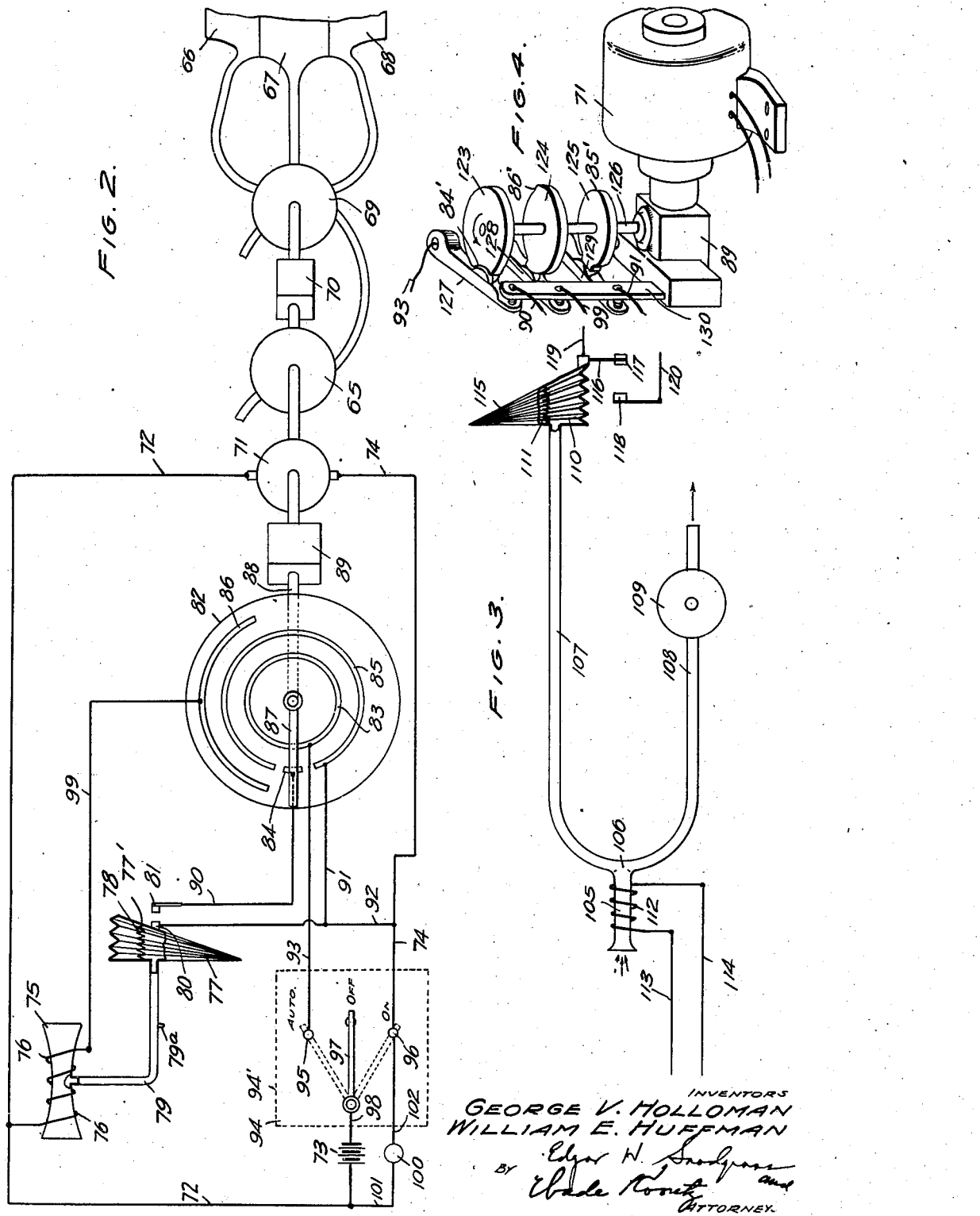
INVENTORS
GEORGE V. HOLLOMAN
WILLIAM E. HUFFMAN
BY
ATTORNEY.

Patented Sept. 26, 1944

2,358,804

UNITED STATES PATENT OFFICE 2,358,804

AUTOMATIC CONTROL FOR ANTI-ICER APPARATUS FOR AIRCRAFT

George V. Holloman and William E. Huffman, Dayton, Ohio

Application February 10, 1940, Serial No. 318,295

9 Claims. (Cl. 244—134)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in aircraft and more especially has to do with means for automatically controlling the operation of ice-prevention or ice-eliminating apparatus for the wing and other surfaces of aircraft.

An object of the invention is to provide a control of an efficient, reliable nature that will act automatically to bring the ice-prevention or ice-eliminating apparatus into play at the proper time when ice-forming conditions occur, and that will so regulate the operation of said apparatus as to prevent the formation or accumulation of ice on the exposed surfaces of the aircraft, and will stop the operation of said apparatus when ice-forming conditions cease.

Another object of the invention is to provide, in conjunction with an automatic control of the character referred to, signalling means that will warn the pilot when ice-forming conditions prevail and also indicate that the ice-prevention or ice-eliminating apparatus is in operation.

The invention, with other objects and advantages thereof, and the particular construction, combinations, and arrangements of parts comprising the same, will be understood from the hereinafter-contained detailed description when considered in connection with the accompanying drawings forming part thereof and illustrating several embodiments of the invention.

In the drawings:

Fig. 1 is a diagrammatic view of a control constructed in accordance with the present invention.

Fig. 2 is diagrammatic showing of a modified construction.

Fig. 3 is a diagrammatic view of a modified form of ice detector and diaphragm unit.

Fig. 4 is a perspective view of a cam make-and-break switch which may be used in lieu of a rotary switch.

While several preferred embodiments of the invention are illustrated in the drawings, it will of course be understood that minor changes and modifications may be made in the particular constructions shown, and the invention may be embodied in other forms, as will appeal to those skilled in the art, falling within the scope of the appended claims, without departing from the spirit of the invention.

The control means provided in accordance with the present invention is susceptible of use for controlling various kinds of ice-prevention or ice-eliminating apparatus. In the particular exemplifications of the invention illustrated in the drawings, the control means is shown in connection with anti-icer apparatus of the type comprising inflatable members associated with the wing and other surfaces of an airplane, and means for supplying fluid pressure to the inflatable members.

Referring to the embodiment of the invention illustrated in Fig. 1 of the drawings, the particular construction of anti-icer apparatus shown by way of example, is a well-known form of such apparatus and is therefor indicated only in a general way.

The expansible members 1, 2, and 3 of the anti-icer apparatus are connected to a rotary distributor valve 4, through suitable pipe connections as shown. A rotary air pump 5 supplies fluid pressure to said members through an exhaust conduit 6 connected to the rotary valve. 7 is an exhaust port to the valve 4, and 8 is an intake port to the pump 5. The speed of the distributor valve is regulated by means of a reduction gear drive 9 between the pump and the valve. The distributor valve acts to periodically connect the expansible members or overshoes 1, 2, and 3 with the pump 5 when the latter is operated.

Referring to a detailed description of the automatic control, 10 designates an electric motor for driving the pump 5 of the anti-icer apparatus, the motor being connected at one terminal by a conductor wire 11 with one side of a storage battery 12 or other suitable source of electrical energy, and having at the other terminal a conductor 13 connected with circuit-controlling devices that are responsive to atmospheric ice-forming conditions.

The circuit-controlling devices include a venturi 14 or similar device appropriately mounted on the aircraft to face toward the front thereof at a point where ice is most likely to form. The venturi is provided with an electric heater coil 15. As illustrated, a diaphragm 16 is connected to the venturi by a pipe 17 to be responsive to change of pressure in the venturi due to collection of ice therein, so that when the venturi is free of ice the diaphragm is held collapsed by the suction or low pressure created in the pipe 17, and when ice collects in the venturi and the latter no longer acts to create suction in said pipe, the diaphragm expands. The pipe 17, or diaphragm 16, is provided with vent means, being, as illustrated, in the form of an aperture 17a in the pipe, the aperture being sufficiently small to "break" the vacuum sealed in the diaphragm when the venturi "ices up," thus enabling the diaphragm to expand, but not so large as to render ineffective the suction effect of the venturi. The diaphragm as shown is provided with a spring 18 to force the same open when it is relieved of the low interior pressure conditions. Obviously, a metallic bellows or Sylphon could be used in lieu of the bellows, in which case the spring would be unnecessary.

The movable wall 16' of the diaphragm is provided with a contact carrying arm 19 having at its free end contacts 20 and 21. The contact 20 is adapted to engage a stationary contact 22 when the diaphragm expands. Contact 21 is adapted to engage a stationary contact 23 when the diaphragm is collapsed. On the movable wall 16' of the diaphragm is also a contact 24. This contact engages a stationary contact 25 when the diaphragm is expanded. To the stationary contact 25 is connected the conductor wire 13 of the motor 10.

The circuit-controlling means also includes a pair of rotary switches 26, 27 and an electric motor 28 for actuating the same. Each of the switches comprises a suitably supported stationary base member of insulating material provided on one face with a plurality of concentrically arranged spaced contacts and a rotary contact arm to cooperate therewith, secured at one end to a shaft that is supported for rotation centrally of the base of the switch and the plurality of contacts thereon. The base 26' of the switch 26 is provided with an inner annular contact 29 and outer contact segments 30, 31, 32, and 33. 34 designates the rotary contact arm. The base member 27' of the switch 27 has an inner ring contact 35 and outer contact segments 36 and 37. The rotary contact arm of this switch is designated 38. The rotary contact arms 34 and 38 of the switches are each connected to the motor 28 by a reduction gear so that they will be rotated clockwise in unison at a very slow rate of speed—for example, around one-sixth of a revolution per minute. In the particular construction shown, the rotary contact arms 34 and 38 of both of the switches are secured to a single shaft 39, said shaft having end portions extending through central openings of the base members of the switches, and the shaft is connected by a suitable reduction gear 40 to the motor 28. The motor 28 has a conductor 41, connected with the contact arm 19 on the movable wall 16' of the diaphragm, and a conductor 42 connected with the conductor wire 11. The contact segment 37 of the switch 27 is connected to the contact 24 on the movable wall 16' of the diaphragm by a conductor 43. The contact segment 36 of said switch is connected by a conductor 44 with the conductor 13, and this contact segment is also connected by a conductor 45 to the inner annular contact 29 of the switch 26. The annular contact 29 is connected by a conductor 46, through the automatic position of a switch 47, more completely hereinafter described, and the conductor 56 to the side of the storage battery 12 opposite to which conductor 11 is connected. The contact segment 30 of the switch 26 is connected by a conductor wire 48 to the conductor 41 of the motor 28. The contact segments 31, 32 are connected respectively to the stationary contacts 22 and 23 by conductors 49 and 50. The electric heater 15 of the venturi has a conductor 51 connected to one side of the storage battery 12 through conductor 11, and a conductor 52 connected to the contact segment 33 of the switch 26.

The switch 47 interposed in the conductor 46 is a manual control switch, the same comprising a switch member 53 pivotally connected at one end to a base 47' that is provided with contacts 54 and 55, denoting the "automatic" (auto) position of operation of the control circuit and the "on" position, respectively. The conductor 46 is connected to the "automatic" contact 54 on the base. The switch member 53 of said switch is always in contact with battery 12 through conductor 56. The "on" contact 55 of the switch is connected by a conductor wire 57 with the motor 10. As will be understood, this switch provides for cutting out the automatic control and operating the motor 10 and the anti-icer apparatus independently thereof, and for cutting out the system entirely.

58 designates an electric lamp or other suitable form of signalling device. The lamp, which is mounted on or near the instrument board of the aircraft, has a conductor 59 connected to the conductor wire 57, which is in contact with conductor wire 13 at the motor 10, and a conductor 60 connected to the other conductor wire 11 of said motor.

Operation

As will be understood, the venturi, when its heater is not in operation, is much more susceptible to ice formation than the wing and other surfaces of aircraft. At the start of the cycle, the rotary contact arms 34 and 38 are in the positions shown in Fig. 1 of the drawings, rotary contact arm 34 of switch 26 engaging the contact segment 31 and rotary contact arm 38 of switch 27 engaging contact segment 37.

When ice forms in the venturi 14, suction through pipe 17 on diaphragm 16 ceases, the vacuum in the diaphragm 16 is relieved through the vent 17a, the diaphragm expands, and contacts 21 and 24 on the movable wall 16' of the diaphragm, respectively, engage the stationary contacts 22 and 25. A circuit is completed from storage battery 12 through conductor 56, switch member 53, conductor 46, inner annular contact 29 of switch 26, conductor 45, inner ring contact 35 of switch 27, rotary contact arm 38, conductor 43, and conductor 13 to motor 10 and back to the battery through conductor 11, the motor 10 being set in operation to operate the anti-icer apparatus. With the completion of this circuit, a circuit is established to the signal lamp 58 through conductors 57—59 and 60. Simultaneously, a circuit is established from battery 12 through switch member 53, conductor 46, inner annular contact 29 of switch 26, rotary contact arm 34, conductor 49, conductor wire 41 to motor 28 and through conductors 42 and 11 back to the battery, starting the motor 28, and the rotary contact arms 34, 38 are rotated clockwise at slow speed. When rotary contact arm 34 of switch 26 reaches contact segments 32 and 33, the motor 28 stops, the circuit of the motor being opened at the contact segment 31 of switch 26. At this time a circuit to the electric heater 15 of the venturi is completed from storage battery 12 through conductor 56, switch member 53, conductor 46, annular contact 29 of switch 26, rotary contact arm 34, contact segment 33, conductor 52, electric heater 15, and conductor 51. The motor 10 continues to operate, since the rotary contact arm 38 of switch 27 has now established a circuit to the motor through conductors 13 and 44, across the contact segments 36 and 35, through conductor 45, annular contact 29 of switch 26 and conductor 46 to battery 12, thereby "shorting" that part of the previous circuit through contacts 24 and 25.

The system may now be said to be in the secondary stage of its cycle—that is, ice has accumulated in the venturi, the diaphragm has expanded, rotary contact arm 38 of switch 27 has moved to segment 35, rotary contact arm 34 of switch 26 has moved to contact segments 32 and 33, the signal lamp 58 is lighted, the electric heater 15 of the venturi is on, and the motor 10 is operating the anti-icer apparatus.

When the ice in the venturi melts, the diaphragm 16 will collapse, carrying contacts 21 and 24 out of engagement with the stationary contacts 22 and 25 and moving contact 20 into engagement with the stationary contact 23. A circuit is completed from the battery 12 through switch member 53, conductor 46, annular contact 29 of the switch 26, rotary contact arm 34, contact segment 32, conductor 50, conductor wire 41 to motor 28, and through conductors 42 and 11 back to the battery, the motor 28 being set in operation to turn the rotary contact arms 34 and 38 of the switches. Rotary contact arm 34 of switch 26 is moved from contact segments 32, 33 to segment 30 and continues to rotate, since the circuit to motor 28 is now completed through conductor 48 in lieu of conductor 50. Likewise, rotary contact arm 38 of switch 27 rotates in contact with inner ring contact 35 and contact segment 36. The system is now in the third stage of its cycle. The ice having melted, there is free passage of air through the venturi; the motor 28 is running, turning the rotary contact arms 34, 38; and the motor 10 is running, operating the anti-icer apparatus. If no ice forms during the time it takes rotary contact arm 34 of switch 26 to travel clockwise from contact segments 32, 33, and 30 to contact segment 31, operation of the system will stop, since with the diaphragm collapsed, contacts 21 and 24 on the diaphragm are disengaged from stationary contacts 22, 25, and the circuits to contact segment 31 of switch 26 and to contact segment 37 of switch 27 are open.

In the event ice does form while rotary contact arm 34 of switch 26 is travelling from contact segments 32, 33, and 30 to contact segment 31, the cycle will be repeated and will continue until ice-forming conditions no longer prevail.

It will be noted that, by the particular combination and arrangement of parts hereinbefore set forth, a control is provided that will act automatically in an efficient, satisfactory manner to bring into operation the anti-icer apparatus at the proper time when ice-forming conditions occur, that will keep the anti-icer apparatus in operation for the proper period, will so regulate the operation of the same as to prevent the accumulation of ice on the exposed surface, and will stop the operation of the anti-icer when ice-forming conditions cease.

As will be understood, the pair of rotary switches provide for nicely timing the switching on and off of the heater of the venturi and the circuit of the motor that operates the anti-icer apparatus, so as to insure the operation of the anti-icer apparatus for a sufficient time to prevent the accumlation of ice on the surfaces to be protected and to stop the operation thereof when not needed. It will also be observed that the control hereinbefore described also provides, in connection with its control of the anti-icer apparatus, means for warning the pilot when ice-forming conditions occur, and also for indicating that the anti-icer apparatus is in operation.

In the modified form of control illustrated in Fig. 2 of the drawings, there is only one motor-actuated rotary switch, and, as shown, this is actuated by the same motor that operates the anti-icer apparatus. However, if it is desired, a separate motor may be used to actuate the switch in a manner similar to that performed by the motor 28 in Fig. 1. The anti-icer apparatus shown in this view is the same as that illustrated in Fig. 1. 65 designates the rotary air pump for supplying pressure to the expansible members or overshoes 66, 67, and 68; 69 is the rotary distributor valve; and 70 is the reduction drive gear connection between the pump and the valve.

The electric motor 71, for driving the pump 65, is connected by a conductor wire 72 to one side of the storage battery 73 and has a conductor wire 74 connected with the circuit-controlling devices hereinafter described. The circuit-controlling devices, as in the form of control illustrated in Fig. 1, include a venturi 75 or similar device, provided with an electric heater coil 76, and a diaphragm 77, provided with a spring 78 and connected to the venturi by a pipe 79, having a vent aperture 79a, so that when the venturi is free of ice, the diaphragm is held collapsed by the suction created in the pipe 79, and when ice collects in the venturi and it stops producing suction in the pipe 79, the diaphragm expands.

On the movable wall 77' of the diaphragm is a contact 80, which is adapted to engage a stationary contact 81 when the diaphragm expands. The motor-actuated switch of this form of the control comprises a base 82 of insulating material, provided on one face thereof with an inner ring contact 83; outer contact segments 84, 85, and 86; and a rotary contact arm 87. The rotary contact arm 87 is secured at one end to a shaft 88, suitably supported for rotation centrally of the base 82 and the contacts thereon, said shaft extending through a central opening in the base. The shaft is connected by a reduction gear 89 to the shaft of the motor 71 to be driven clockwise at very low speed—for instance, one-sixth of a revolution per minute or thereabouts— the same as the rotary contact arms of the switches in the construction illustrated in Fig. 1.

The stationary contact 81 is connected by a conductor wire 90 with the contact segment 84 of the rotary switch, and the contact 80 on the movable wall 77' of the diaphragm is connected by a conductor 91 to the segmental contact 85 and also connected by conductor 92 to the conductor 74 of the motor. The inner ring contact 83 is connected by a conductor 93 through the automatic position of a switch 94 to one side of the battery 73.

The switch 94 interposed in the conductor 93 is a manual switch identical to the switch 47 described in the first embodiment. The switch is mounted on base 94' and provded with "automatic" (auto) position contact 95, "on" position contact 96, and switch member 97. The switch member 97 is always in contact with the battery 73 through conductor 98. The "on" contact 96 of the switch is connected to the motor 71 by a conductor 74.

The electric heater 76 has a conductor 99 that is connected to the outermost segment 86 of the switch and connects to one side of the battery 73 by means of conductor 72.

100 is the signalling device, having a conductor 101 connected with the conductor 72 of the motor and a conductor 102 connected with the conductor wire 74 of the motor.

This modified form of control system operates as follows: At the beginning of the cycle the rotary contact arm 87 of the switch is in the position shown in the drawings, in engagement with the contact segment 84. When ice forms in the venturi, suction through pipe 79 on diaphragm 77 ceases, the diaphragm expands and contact 80 on the movable wall 77' of the diaphragm is moved into engagement with the stationary contact 81, and a circuit is established through conductor 90, contact segment 84 of the switch, rotary contact arm 87, inner ring segment 83, conductor 93, switch member 97, conductor 98, battery 73, conductor 72, motor 71, conductor 74, conductor 92, and conductor wire 91—the motor 71 being set in operation to operate the anti-icer apparatus. With the completion of the motor circuit, a circuit is established to the signal lamp 100, through the conductors 101 and 102; and the contact arm 87 of the switch is now turned very slowly by the motor. When the contact arm 87 reaches contact segment 86, a circuit to the heating coil 76 of the venturi is completed from battery 73 through conductor 72, conductor 99, contact segment 86, rotary contact arm 87, inner ring contact 83, conductor 93, switch member 97, and conductor 98 back to the battery. The heater circuit is maintained as long as the rotary contact arm 87 remains in engagement with the contact segment 86, the heater continuing to function long enough to melt the ice in the venturi. While the rotary contact arm is in engagement with the contact segment 85, a circuit for the motor is completed from the battery through conductor 72, conductor 74, conductor 92, conductor 91, contact segment 85, rotary contact arm 87, inner ring contact 83, conductor 93, switch member 97, and conductor 98 back to the battery. As will be understood, if ice does not again collect in the venturi during the time it takes rotary contact arm 87 to travel clockwise from the contact segment 86 to contact segment 84, the motor will stop, the motor circuit being opened by the collapsing of the diaphragm. If ice again forms in the venturi during the time it takes the rotary contact arm 87 to travel from the contact segment 86 to contact segment 84, the system will continue in operation.

In Fig. 3 of the drawings is shown a modified form of ice detector and control tube. This consists of a plain straight tube portion 105 having a slightly flaring forward end and a curved rearward extension 106 having two branches—107 and 108. A continuously-driven rotary suction pump 109 is connected to the tube 105 by means of branch 108, and diaphragm 110 is connected to the tube by branch 107, the construction being such that when the straight tube portion 105 is free of ice, the diaphragm will be expanded by its spring 111, as shown, and when ice collects in the straight tube portion 105, the diaphragm will be collapsed due to suction in the pipe 107. The suction pump 109 may be operated in any suitable way. 112 designates a heating coil for the straight tube portion 105, the heating coil having conductors 113 and 114. The movable wall 115 of the diaphragm has an arm 116 carrying a contact 117 which is adapted to engage a stationary contact 118 when the diaphragm is collapsed. 119 designates a conductor connected to contact arm 116, and 120 is a conductor wire connected to the stationary contact 118. As will be understood, the modified form of the ice detector and control tube illustrated in Fig. 3 may be substituted for the venturi in the two forms of control illustrated in Figs. 1 and 2 of the drawings, the heating coil 112 of the straight tube portion 105, the contact arm 116 on the movable wall of the diaphragm, and the stationary contact 118 being connected in the circuit similarly to the connection of the corresponding parts in the constructions illustrated in Figs. 1 and 2.

In Fig. 4 is shown a cam make-and-break type switch which is designed and illustrated for use in lieu of the rotary type switch shown in Fig. 2. It will be obvious that with suitable modification of design, this type switch may also be used in lieu of the rotary type switches shown in Fig. 1.

This switch, as illustrated for substitution for the rotary switch 82 shown in Fig. 2, is shown with motor 71 connected through reduction gear 89 to a series of cams 123, 124, and 125, fixedly mounted on a shaft 126. The cams are provided respectively with recessed portions 84', 86', and 85', corresponding in relative design to the contact segments 84, 86, and 85 of switch 82; that is, the recess 84' in cam 123 is relatively a small portion of the circumference; the recess in cam 124 extends for nearly one-half the circumference; and the recess of cam 125 extends for all but a relatively small portion of the circumference. Arranged to cooperate with the cams are a series of breakers 127, 128, and 129, which are adapted to be commonly, electrically connected to the lead 93 from the manual selective switch 94. Each breaker is provided with a contact adapted to engage a corresponding contact in an insulated mounting panel 130. The breakers are provided with electrically insulated lobes adapted to cooperate with the cams so that the contacts on the breakers close the electrical circuits by engaging the contacts of the panel 130 when the lobes are in the cam recesses, and open the circuit when the lobes are out of the recesses. To the contacts in the mounting panel are secured leads 90, 99, and 91. It will thus be seen that lead 90 is adapted to provide a circuit through breaker 127 which corresponds to the circuit through switch arm 87 and segment 84 of switch 82; lead 99 is adapted to provide a circuit through breaker 128 which corresponds to the circuit through switch arm 87 and segment 86 of switch 82; and lead 91 is adapted to provide a circuit through breaker 129 which corresponds to the circuit through switch arm 87 and segment 85 of switch 82.

The operation of the modification shown in Fig. 2, when used with this switch shown in Fig. 4, is such that when the circuit is closed at contacts 80 and 81, the circuit is completed to motor 71 through conductors 74 and 92 and lead 90, breaker 127 and lead 93, since the lobe of breaker 127 is designed to rest in the recess 84' of cam 123 in the position of the switch during periods of inoperation of the anti-icer apparatus. The closing of the circuit at contacts 80 and 81 starts the operation of the motor, causing the cams to rotate in a counterclockwise direction. The circuit made by breaker 127 is then opened, and the lobe of breaker 128 drops into the recess 86' of cam 124, closing the circuit to the heater 76 through lead 93, breaker 128, and lead 99. Continued rotation of the cam 124 again forces the lobe of breaker 128 out of recess 86', disconnecting the heater. At substantially the same time that the lobe of breaker 127 is forced out of recess 84' the lobe of breaker 129 drops into the recess 85' of cam 125, closing the circuit to the motor 71 through conductors 74 and 92, lead 91, breaker 129, and lead 93.

In this manner the operation of the anti-icer apparatus will be controlled exactly as described in connection with the modification shown in Fig. 2.

Having thus described our invention, what we claim is:

1. In a power actuated de-icing apparatus, means for automatically controlling the operation of said apparatus, including an electric circuit, an electric motor, and means responsive to the formation of ice thereon adapted to close said circuit when ice collects on said last-mentioned means and to open the circuit when the ice is melted, electric heating means for said last-mentioned means, an electric circuit for the heating means, and a switch in said last-mentioned circuit, said switch being operatively connected to said motor in such manner that it is adapted when actuated by the motor to close the circuit of the heating means for short intervals.

2. Means for automatically controlling the operation of apparatus for preventing the accumulation of ice on aircraft surfaces, said means including an electric circuit having a source of energy, a motor in said circuit for operating said apparatus, switch means in said circuit for connecting said motor with said source of energy, a second motor for operating said switch means, and a circuit for said second motor, comprising ice formation responsive means adapted to close said last-mentioned circuit when ice forms on said ice formation responsive means and to open said circuit when ice formation ceases.

3. The combination with apparatus for preventing the accumulation of ice on aircraft surfaces, of an electric circuit, an electric motor in said circuit for operating said apparatus, and means for automatically controlling the operation of said apparatus, including a second electric motor, an electric circuit for the same, means responsive to the formation of ice thereon adapted to close both of said motor circuits when ice collects on said means and to open said circuits when the ice is melted, an electric heater for said last-mentioned means, an electric circuit for the heater, a rotary switch, and a reduction drive gear connection between the switch and the second electric motor, said switch being adapted to intermittently open and close the circuit of said heater during operation of said apparatus.

4. The combination with apparatus for preventing the accumulation of ice on aircraft surfaces, of an electric circuit, an electric motor in the circuit for operating said apparatus, and means for automatically controlling the operation of said apparatus, including a pair of rotary switches in the circuit, a second electric motor with circuit connections therefor for operating said switches, reduction drive gear connections between the switches and the second motor, means responsive to the formation of ice thereon adapted to close circuits through both of the motors when ice collects on said last-mentioned means, an electric heater for said last-mentioned means with circuit connections for the heater, one of said switches being adapted during a partial revolution thereof to open the circuit through the second motor to stop rotation of the switches and to close a circuit through the heater, the other switch during a partial revolution thereof acting to close a circuit through the first-mentioned motor during the interval the second motor stops, and said last-mentioned means when the ice thereon is melted closing a circuit through the second motor to turn the switches to open the heater circuit and both of the motor circuits.

5. The combination with apparatus for preventing the accumulation of ice on aircraft surfaces, of an electric circuit, an electric motor in the circuit for operating said apparatus, and means for automatically controlling the operation of said apparatus, including a pair of rotary switches in the circuit, a second electric motor with circuit connections therefor for operating said switches, a reduction drive gear connection between each of the switches and the second motor for turning the switches in unison, a tube for accelerated passage of air therethrough having one end thereof facing toward the front of the aircraft, a suction responsive element operatively connected with said tube and being responsive to change of pressure in the tube, said suction responsive element being adapted to close circuits through both of the motors when ice collects in said tube, an electric heater for said tube with circuit connections for the heater, one of said switches being adapted in the course of a partial revolution thereof to open the circuit through the second motor to stop rotation of the switches and to close a circuit through the heater, the other switch during a partial rotation thereof acting to close the circuit through the first-mentioned motor during the interval the second motor stops, and said suction responsive element when the ice in said tube is melted closing a circuit through the second motor to turn the switches to open the heater circuit and both of the motor circuits.

6. The combination with apparatus for preventing the accumulation of ice on a surface of an aircraft, said apparatus including power means for actuating same, of means responsive to ice formation for rendering said power means operative when ice forms thereon and inoperative when ice is removed therefrom, said last-mentioned means comprising a tube, a suction pump connected with said tube rearwardly of the forward end portion thereof, a suction responsive element communicatively connected to said tube intermediate the forward end portion and the point of connection with said suction pump, said suction responsive element being responsive to change of pressure in the tube for rendering said power means operative when ice forms in said tube and inoperative when ice is removed therefrom.

7. In an automatic control for apparatus for preventing the accumulation of ice on a vehicle surface, means responsive to ice formation for initiating operation of said apparatus comprising an open tube having one end thereof facing toward the front of said vehicle and having inner contours to form a venturi such that a suction is created at the Venturi throat by the flow of air through said tube, a suction-responsive element communicatively connected to said tube at the zone of suction, and means associated with said element for rendering said apparatus operative when ice is formed in said tube, stopping the suction, and for rendering said apparatus inoperative when said tube is free from ice and air is flowing therethrough.

8. In an automatic control device for controlling apparatus for de-icing aircraft surfaces, an electric circuit for rendering said apparatus operative and inoperative, switch contact means operative to control the energizing of said circuit, means normally biasing said contact means to close said electric circuit, and means responsive to ice formation for controlling operation of said contact means comprising a Venturi tube positioned in the airstream for unobstructed flow therethrough, a conduit connected to the throat of said venturi such that flow through the latter normally produces a reduced pressure in said conduit while icing of the walls of said venturi blocks off the communication with said conduit, a restricted vent connection between said conduit and the atmosphere, and a pressure responsive means operatively associated with said contacts and connected to said conduit and operative upon a predetermined reduction in pressure in said conduit to open said contacts to de-energize said electric circuit.

9. In an automatic control system for controlling apparatus for de-icing aircraft surfaces, an electric circuit for rendering said apparatus operative and inoperative, switch contact means operative to control the energizing of said electric circuit, means normally biasing said contact means to open said electric circuit, and means responsive to ice formation for controlling operation of said contact means comprising a tube having an open end positioned in the airstream, a conduit connected to the other end of said tube, said tube when unobstructed by ice serving as a vent for said conduit to the atmosphere, suction producing means tending to continuously withdraw air from said conduit, and a pressure responsive device operatively associated with said contact means and connected to said conduit and operative upon a predetermined reduction in pressure within said conduit to close said contact means to energize said electric circuit.

GEORGE V. HOLLOMAN.
WILLIAM E. HUFFMAN.